Patented Dec. 30, 1952

2,623,863

UNITED STATES PATENT OFFICE 2,623,863

PROCESS FOR MAKING THERMOPLASTIC COMPOSITIONS FROM RESINOUS POLYMERS OF MONOVINYL AROMATIC HYDROCARBONS AND RUBBER

James Robert Dieckmann, Akron, Ohio, and Lawrence W. Muscott, Sanford, and Arthur F. Roche, Freeland, Mich., assignors to The Dow Chemical Company, Midland, Mich., a corporation of Delaware No Drawing. Application March 29, 1951, Serial No. 218,274

6 Claims. (Cl. 260—4)

This invention relates to the production of thermoplastic compositions made from resinous polymers of monovinyl aromatic hydrocarbons and a natural or synthetic rubber. It particularly concerns a process for making such compositions in a form having good molding characteristics and high impact strength.

It is known that the mechanical properties of polystyrene can be improved by incorporating a small amount, e. g. from one to ten per cent by weight, of rubber therewith. Methods of making the compositions are well known. One such method consists in dissolving or swelling a rubber in monomeric styrene and heating the mixture to polymerize the styrene. The polystyrene-rubber mix thus obtained is mechanically worked or masticated, e. g. by milling on heated compounding rolls, to intimately mix the components and form a homogeneous mass suitable for use as a molding composition. These compositions have been found useful for many applications involving usual compression or injection molding operations, and articles prepared therefrom possess impact strength and per cent elongation values greater than those of similar articles made from polystyrene. However, such compositions have not been found satisfactory for the production of extruded articles, e. g. rods, bars, strips, or sheets, etc., formed by extrusion of the compositions possess rough, irregular, or pebbled, surfaces of unpleasing appearance. It has further been observed that the mechanical properties of the compositions become poorer upon aging and that the degradation of the properties is accelerated upon exposure to sunlight or ultraviolet light. This degradation of the mechanical properties, particularly the lowering of impact strength and per cent elongation values upon exposure to light, restricts greatly, use of the compositions for many purposes.

It is an object of the invention to provide a process for making a thermoplastic composition from a hard resinous polymer of a monovinyl aromatic hydrocarbon and a rubbery elastomer, which composition has good aging characteristics and high impact strength. Another object is to produce thermoplastic compositions suitable for molding which are mechanical mixtures composed principally of a resinous polymer of a monovinyl aromatic hydrocarbon and a rubbery copolymer of styrene and butadiene, or a rubbery copolymer of acrylonitrile and butadiene. Still another object is to provide a process for making a homogeneous composition from a polymerized monovinyl aromatic hydrocarbon and a rubbery elastomer by simple and direct procedure. A further object is to provide a process for making thermoplastic compositions from polystyrene and rubbery copolymers of styrene and butadiene, or copolymers of acrylonitrile and butadiene, which compositions can readily be molded by usual injection molding or extrusion operations to form articles having good mechanical properties and a smooth glossy surface. Other and related objects will become apparent from the following description of the invention.

According to the invention thermoplastic compositions having good molding characteristics and high impact strength can readily be prepared from a resinous polymer of a monovinyl aromatic hydrocarbon and a rubber such as an unvulcanized natural or synthetic rubber, by blending a hard normally solid polymer of a monovinyl aromatic hydrocarbon, a rubbery elastomer, e. g. a rubbery copolymer of butadiene and styrene, a liquid plasticizing agent and a peroxy compound having a thermal decomposition temperature above 95° C., into a homogeneous mass by mechanically working or masticating the ingredients at a heat-plastifying temperature between 140° and 230° C.

It has been found that by mechanically working or masticating a mixture of a resinous polymer of a monovinyl aromatic hydrocarbon and an unvulcanized natural or synthetic rubber at a heat-plastifying temperature of from 140° to 230° C. with a minor amount, e. g. 5 per cent by weight or less, of a liquid plasticizer, into a homogeneous mass and thereafter intimately mixing a lesser amount, suitably from 0.001 to 0.25 per cent by weight, of an organic peroxide having a thermal decomposition temperature above 95° C., with the heat-plastified mass, the rubber or rubbery elastomer and the polymerized monovinyl aromatic hydrocarbon are readily caused to form a homogeneous composition in which the dispersed polymer particles appear to be held together by bonds. The resinous compositions thus prepared do not exhibit aggregation of the dispersed solid polymer particles, but possess good molding characteristics, together with high impact strength. The mechanical properties such as the impact strength and per cent elongation values of the compositions will vary depending upon the kind and the relative proportion of the rubber or rubbery elastomer incorporated with the resinous polymer. In all instances, the compositions possess good molding characteristics, together with an improvement in impact strength, when compared to similar compositions prepared from the same resinous polymer and rubbery elastomer in the absence of an organic peroxide under otherwise similar compounding conditions. The compositions can readily be extruded to form articles having a smooth surface and a pleasing appearance.

Polystyrene having a molecular weight of from 60,000 to 100,000 as determined by the well known Staudinger method, is the preferred polymerized monovinyl aromatic hydrocarbon to be employed in preparing the compositions, but the resinous polymers and copolymers of other monovinyl aromatic hydrocarbons such as ortho, meta and para-methylstyrene, meta-ethylstyrene, para-ethylstyrene, para-isopropylstyrene, ar-dimethylstyrene, ar-methyl-ar-ethylstyrene, and ar-diethylstyrene, or copolymers of any of these compounds with styrene may also be used. Resinous copolymers of a monovinyl aromatic hydrocarbon, e. g. styrene, and an alkenyl aromatic hydrocarbon such as alpha-methylstyrene, alpha-ethylstyrene, para-methyl-alpha-methyl-stryrene, and para-isopropyl-alpha-methylstyrene, which copolymers contain at least 75 per cent by weight of the monovinyl aromatic hydrocarbon chemically combined with the alkenyl aromatic hydrocarbon, may satisfactorily be used. The resinous polymer is used in amount of from 75 to 95 per cent by weight of the composition.

The resinous polymers should have an average molecular weight corresponding to a viscosity characteristic of from 20 to 80 centipoises, preferably from 40 to 80 centipoises, at 25° C. The viscosity characteristic is determined by dissolving a portion of the polymer in toluene to form a solution containing 10 per cent by weight of the polymer and determining the absolute viscosity in centipoises at 25° C. of the solution.

In general, the compositions prepared from polymers having a high molecular weight, i. e. a molecular weight of 60,000 or greater, have impact strength values which are higher than those of similar compositions prepared from the polymers of lower molecular weight, e. g. a molecular weight of 40,000.

The rubbery elastomer may be natural rubber, or a synthetic rubber of the Buna S or Buna N type such as the rubbery copolymers of butadiene and styrene, or copolymers of butadiene and acrylonitrile. Examples of suitable rubbery elastomers are natural pale crepe rubber, rubbery copolymers of from 40 to 80 per cent by weight of butadiene and from 60 to 20 per cent of styrene, and copolymers of from 18 to 35 per cent by weight of acrylonitrile and from 82 to 65 per cent of butadiene. The rubbery elastomer is used in amount corresponding to from 2 to 20 per cent, preferably from 4 to 15 per cent, by weight of the composition.

Any substantially non-volatile organic compound which is a plasticizer or flow agent for polystyrene and is liquid over a temperature range of from 70° to 230° C. may be used as the plasticizing agent in preparing the resinous compositions. The oil or oily liquid to be used should be soluble, or at least partly soluble, in the polymerized monovinyl aromatic hydrocarbon and the rubbery elastomer components of the composition and should have a boiling point above 200° C. The type of oil or oily liquid may vary widely. Oils of mineral, vegetable, and animal origin may be used. The oils are preferably non-drying such as white mineral oil, sesame oil, or peanut oil, or semi-drying such as soybean oil or castor oil. Oily liquid organic compounds such as stearic acid, nor.-butyl stearate, dibutylphthalate, or dioctyldiphenyl ether, and the like, may be used. Other suitable materials include natural and synthetic hydrocarbons, e. g. diisopropylbenzene, triethylbenzene, diisopropyltoluene, or nor.-dodecane, and the liquid polymers of unsaturated alkenyl aromatic hydrocarbons such as the liquid dimers and trimers of alpha-methylstyrene or para-methyl-alpha-methylstyrene. The plasticizer is used in amount of from 1 to 5 per cent by weight of the composition.

The organic peroxy compound should have a thermal decomposition temperature of at least 95° C. or above. Suitable organic peroxy compounds are benzoyl peroxide, di-(tertiary-butyl perphthalate), tertiary-butyl percaprylate, di-(tertiary-butyl) peroxide, and tertiary-butyl perbenzoate. The organic peroxy compound may be used in amount corresponding to from 0.001 to 0.25 per cent by weight, based on the weight of the composition, but an amount of the organic peroxide of from 0.01 to 0.1 per cent is preferred. The organic peroxy compound is preferably dissolved in the liquid plasticizer, or a portion of the liquid plasticizer, and the solution is mixed with a heat-plastified mass of the other ingredients so as to uniformly disperse the peroxide throughout the heat-plastified mass while compounding the same into a homogeneous composition.

In preparing the compositions the polymeric starting materials, i. e. the polymer and the rubber, suitably in granular form, may be blended together and mixed with a liquid plasticizer in the desired proportions to form a dry-mix for convenience in handling. The mixture is fed to a suitable machine such as a "Banbury mixer" or a plastics extruder where it is heat-plastified and mechanically worked, or masticated, into a uniform mass by specially designed rotors which knead, roll and tear the material. The mass is maintained at heat-plastifying temperatures of from 140° C. to 230° C., preferably from 160° to 210° C., and the organic peroxide is added in the desired amount and mixed into the composition to form a homogeneous mass. In general, a homogeneous composition is obtained by masticating the mixture of components at temperatures of from 160° to 210° C. for a period of time of from 3 to 15 minutes. Prolonged mechanical working of the resinous composition at elevated temperatures should be avoided so as not to produce excessive molecular breakdown of the polymeric components, although some molecular deterioration of the resinous polymer and the rubbery elastomer components appears to be beneficial.

In a preferred practice, the polymer and the rubber in granular form are blended with a portion, suitably from 25 to 75 per cent, of the liquid plasticizer used and the mixture is mechanically worked or masticated at temperatures between 140° and 230° C. to uniformly disperse the ingredients with each other. Thereafter, a solution of the remaining portion of the liquid plasticizer and the organic peroxide in the desired amount, is added to the heat-plastified materials while compounding the same into a homogeneous composition.

Other ways of incorporating the ingredients with each other to form a homogeneous mass will be apparent to those skilled in the art. For instance, a resinous polymer of styrene and a rubbery copolymer of styrene and butadiene may be mixed on heated compounding rolls or in a Banbury mixer in the presence or absence of a liquid plasticizer to form a concentrate, i. e. an intimate mixture of the rubbery copolymer and the polystyrene containing 50 per cent by weight or more of the rubbery copolymer, and the concentrate mixed with an additional amount of the polystyrene, which mixture is then heat-plastified and compounded with a solution of a liquid plasticizer and the organic peroxide to form a homogeneous composition of the ingredients in the desired proportions.

The resinous composition is cooled and cut or ground to a granular form suitable for use as a molding powder.

The following examples illustrate ways in which the principle of the invention has been applied, but are not to be construed as limiting the scope of the invention.

EXAMPLE 1

In each of a series of experiments, a mixture of 92 parts by weight of a molding grade of polystyrene having a viscosity characteristic (10 weight per cent solution in toluene) of 40 centipoises at 25° C. and 5 parts of synthetic GRS-30 (a copolymer of approximately 23.5 per cent by weight of styrene and 76.5 per cent of butadiene) each in granular form, was pre-mixed by passing the same through an extruder wherein it was heated to temperatures between 190° and 210° C. The mixture was milled for a period of about 5 minutes on a pair of compounding rolls, each of 3 inches diameter and 8 inches length. One of the rolls was internally heated with steam at 40 pounds per square inch gauge pressure and the other was internally heated with steam at 10 pounds pressure. The heat-plastified mixture was milled with 2 parts of nor.-butyl stearate, 1 part of white mineral oil and di-(tertiary-butyl perphthalate) in amount as stated in the following table, for a period of six minutes to form a homogeneous mass. The product was removed from the rolls, allowed to cool, and was crushed to a granular form suitable for molding. The product from each of the experiments was injection molded to form test bars of ⅛ x ½ inch rectangular cross section. These test bars were used to determine the tensile strength in pounds per square inch of original cross section, the per cent of its original length by which a test bar could be elongated under tension before breakage occurred and the impact strength expressed as foot-pounds of energy per inch of notch to break a test bar. Except for the size and shape of the test bars, the procedures used in determining tensile strength and per cent elongation were similar to those described in A. S. T. M. D638–49T. The procedure used in determining impact strength was similar to that described in A. S. T. M. D256–43T. Table I identifies each composition by giving the proportions of the ingredients in parts by weight from which it was prepared. The table also gives the properties determined for each composition.

*Table I*

| Run No. | Starting materials | | Added ingredients | | | Properties of products | | |
|---|---|---|---|---|---|---|---|---|
| | Polystyrene, parts | GRS-30, parts | Butyl stearate, parts | White mineral oil, parts | Di-(tertiary-butyl perphthalate) parts | Tensile strength, lbs./sq. in. | Per cent elongation | Notched impact strength, ft.-lbs. |
| 1 | 92 | 5 | 2 | 1 | 0 | 5,870 | 19 | 1.6 |
| 2 | 92 | 5 | 2 | 1 | .01 | 5,930 | 20.6 | 1.7 |
| 3 | 92 | 5 | 2 | 1 | .04 | 6,550 | 17.5 | 1.9 |
| 4 | 92 | 5 | 2 | 1 | .07 | 6,200 | 17.8 | 2.6 |
| 5 | 92 | 5 | 2 | 1 | .10 | 6,050 | 23.0 | 2.7 |

EXAMPLE 2

In each of a series of experiments, a mixture of 92 parts by weight of the polystyrene and 5 parts of the GRS-30 rubber, described in Example 1, was mechanically worked in a Banbury mixer at temperatures between 150° and 155° C. over a period of about 3 minutes. The heat-plastified mass was mixed with 2 parts of nor.-butyl stearate, 1 part of white mineral oil and di-(tertiary-butyl perphthalate) in amount as stated in the following table, and mechanically worked for a period of from 8–10 minutes to form a homogenous composition. The product was removed from the mixer, was allowed to cool and was crushed to a granular form. The product from each of the experiments was injection molded to form test bars of ⅛ by ½ inch rectangular cross section. These test bars were used to determine the properties for each composition as described in Example 1. Table II identifies each composition by giving the proportions of the ingredients in parts by weight from which it was prepared. The table also gives the properties determined for each composition. For purpose of comparison, the properties of a composition prepared in similar manner, except in the absence of the di-(tertiary-butyl perphthalate) is also given in the table.

*Table II*

| Run No. | Starting materials | | Added ingredients | | | Properties of products | | |
|---|---|---|---|---|---|---|---|---|
| | Polystyrene, parts | GRS-30, parts | Butyl stearate, parts | White mineral oil, parts | Di-(tertiary-butyl perphthalate) parts | Tensile strength, lbs./sq. in. | Per cent elongation | Notched impact strength, ft.-lbs. |
| 1 | 92 | 5 | 2 | 1 | 0 | 5,925 | 22.5 | 1.2 |
| 2 | 92 | 5 | 2 | 1 | .10 | 5,575 | 24.8 | 2.2 |
| 3 | 92 | 5 | 2 | 1 | .15 | 5,835 | 21.9 | 1.9 |
| 4 | 92 | 5 | 2 | 1 | .20 | 6,030 | 18.3 | 2.7 |
| 5 | 92 | 5 | 2 | 1 | .25 | 6,120 | 19.2 | 2.0 |

EXAMPLE 3

A mixture of 89.5 parts by weight of a polystyrene containing one per cent by weight of white mineral oil intimately incorporated therewith as lubricant, and having a viscosity characteristic (10 weight per cent solution in toluene) of 30 centipoises at 25° C., 7.5 parts of a rubbery copolymer of 18 per cent by weight of acrylonitrile and 82 per cent of butadiene, 1 part of nor.-butyl stearate and 1 part of white mineral oil, was milled for a period of about 5 minutes on a pair of compounding rolls, each of 3 inches diameter by 8 inches length. One of the rolls was internally heated with steam at 40 pounds per square inch gauge pressure and the other was internally heated with steam at 10 pounds pressure. The heat-plastified mixture was milled with 1 part of a solution of 90 per cent by weight of dibutyl phthalate and 10 per cent of di-(tertiary-butyl perphthalate), for a period of 10 minutes to form a homogeneous composition. The product was removed from the rolls, was allowed to cool and was crushed to a granular form. The properties of the composition were determined as described in Example 1 and were found to be:

Tensile strength _____lbs./sq. in__ 5,600
Elongation _____per cent__ 26
Impact strength _____ft.-lbs__ 2.3

EXAMPLE 4

In each of a series of experiments a mixture of 89.5 parts of a granular polystyrene having a viscosity characteristic (10 weight per cent solution in toluene) as stated in the following table and 7.5 parts of GRS-26 synthetic rubber (a copolymer of 23.5 per cent by weight of styrene and 76.5 per cent of butadiene), was pre-mixed and milled for a period of about 5 minutes on a pair of compounding rolls, each of 3 inches diameter by 8 inches length. One of the rolls was internally heated with 40 pound steam and the other was internally heated with 10 pound steam. The heat-plastified mixture in each of the experiments was milled with 1.95 parts of nor.-butyl stearate, 1 part of white mineral oil and 0.05 part of di-(tertiary-butyl perphthalate), for a period of 10 minutes to form a homogeneous composition. The product was removed from the rolls, was allowed to cool and was crushed to a granular form. The properties of the compositions were determined as described in Example 1. Table III identifies each composition by giving the viscosity characteristic of the polystyrene and the proportions of the ingredients in parts by weight from which it was prepared. The table also gives the properties determined for each composition.

lubricant, 15 parts of synthetic GRS-26 rubber, 1.95 parts of nor.-butyl stearate, 1 part of white mineral oil and 0.5 part of di-(tertiary-butyl perphthalate) into a homogeneous mass by procedure similar to that described in Example 1. The composition had the properties:

Tensile strength _____lbs./sq. in__ 4150
Elongation _____per cent__ 40.8
Notched impact strength _____ft.-lbs__ 3.1

The resinous composition can be extruded to form articles having a smooth glossy surface.

EXAMPLE 6

A mixture of 92 parts by weight of polystyrene and 5 parts of GRS-30 synthetic rubber was mechanically worked in a Banbury mixer at a temperature of about 210° C. over a period of 3 minutes. Two parts of nor.-butyl stearate, 1 part of white mineral oil and 0.10 part of di-(tertiary-butyl perphthalate), were added to the heat-plastified mass and mixed into the composition over a period of 10 minutes longer. The composition was removed from the mixer, was cooled and was cut into granular form. A portion of the composition was fed into an extruder where it was heated to a temperature of 166° C. and was discharged through a die as a strip having the dimensions ½ inch wide by $\frac{1}{16}$ inch thick. The extruded strip had a smooth surface and a pleasing appearance. Other portions of the composition were injection molded to form test bars of ⅛ by ½ inch rectangular cross section. These test bars were used to determine the properties for the composition as described in Example 1. The composition had the properties:

Tensile strength _____lbs./sq. in__ 5810
Elongation _____per cent__ 21.8
Notched impact strength _____ft.-lbs__ 3.3

EXAMPLE 7

A mixture of 91 parts by weight of polystyrene and 6 parts of a rubbery copolymer of 23.5 per cent by weight of styrene and 76.5 per cent of butadiene, was milled for a period of 5 minutes on a pair of compounding rolls each of 3 inches diameter by 8 inches length. The rolls were internally heated with steam at 40 pounds per square inch gauge pressure. Two parts of nor.-butyl stearate, 1 part of white mineral oil and 0.05 part of di-(tertiary-butyl perphthalate) were added to the heat-plastified mass on the rolls and mixed into the composition over a period of 10 minutes longer. The composition was removed from the rolls, was cooled and was

*Table III*

| Run No. | Starting materials | | | | | Properties of products | | |
|---|---|---|---|---|---|---|---|---|
| | Polystyrene | | GRS-26, parts | Butyl stearate, parts | White mineral oil, parts | Di-(tertiary-butyl perphthalate) parts | Tensile strength, lbs./sq. in. | Percent elongation | Notched impact strength, ft.-lbs. |
| | Parts | Viscosity, cps. | | | | | | | |
| 1 | 89.5 | 20 | 5 | 1.95 | 1 | 0.05 | 5,150 | 23.5 | 1.5 |
| 2 | 89.5 | 45 | 5 | 1.95 | 1 | 0.05 | 5,420 | 27.6 | 2.1 |
| 3 | 89.5 | 60 | 5 | 1.95 | 1 | 0.05 | 5,920 | 29.3 | 2.9 |
| 4 | 89.5 | 80 | 5 | 1.95 | 1 | 0.05 | 6,670 | 23.6 | 3.8 |

EXAMPLE 5

A thermoplastic composition was made by milling 82 parts by weight of a molding grade polystyrene containing one per cent by weight of white mineral oil intimately mixed therewith as ground to a granular form suitable for molding. Portions of the composition were injection molded to form test bars of ⅛ by ½ inch rectangular cross section. These test bars were used to evaluate the aging characteristics of the composition. The procedure used to evaluate the aging characteristics was to determine the percent of its original length by which a test bar could be elongated under tension before breakage occurred, both on test bars as originally molded and on test bars after exposure to ultraviolet light. The procedure used in aging the test bars was similar to that described in A. S. T. M. D975-49 for determining light stability, except that the test bars were exposed to rays of an S-4 sunlamp for a period of 24 hours. The procedure used in determining percent elongation was similar to that described in A. S. T. M. D638-49T. The composition had a percent elongation value of 23.2 per cent as originally molded and an elongation value of 18.1 per cent after aging for 24 hours under the S-4 sunlamp.

By way of comparison a composition prepared by polymerizing a solution of 93 parts by weight of styrene, 2 parts of white mineral oil and 5 parts of a rubbery copolymer of 23.5 per cent by weight of styrene and 76.5 per cent of butadiene, was mechanically worked for a period of 10 minutes in a Banbury mixer heated with steam at 40 pounds per square inch gauge pressure, to form a homogeneous mass. The composition was removed from the mixer, was allowed to cool and was crushed to a granular form. Portions of the composition were injection molded to form test bars of ⅛ by ½ inch cross section. The aging characteristics of the composition were evaluated by procedure as just described. The composition had a per cent elongation value of 23 per cent as originally molded, but had an elongation value of only 7 per cent after aging for 24 hours under the S-4 sunlamp.

Other modes of applying the principle of the invention may be employed instead of those explained, change being made as regards the step or steps herein employed, provided the step or steps stated in any of the following claims or the equivalent of such step or steps be employed.

We claim:

1. The method of making a thermoplastic composition containing a polymerized monovinyl aromatic hydrocarbon and rubber, which comprises blending from 75 to 95 parts by weight of a resinous polymer of a mixture of alkenyl aromatic hydrocarbons containing at least 75 per cent by weight of a monovinyl aromatic hydrocarbon having the vinyl group as the sole non-aromatic unsaturation; in chemically combined form, from 2 to 20 parts of a rubbery elastomer selected from the group consisting of natural rubber, rubbery copolymers of from 40 to 80 per cent by weight of butadiene and from 60 to 20 per cent of styrene and copolymers of from 18 to 35 per cent by weight of acrylonitrile and from 82 to 65 per cent of butadiene, and from 1 to 5 parts of a liquid plasticizer having a boiling point above 200° C. into a uniform mass by mechanically working a mixture of the ingredients at a heat-plastifying temperature between 140° C. and 230° C., thereafter incorporating from 0.001 to 0.25 per cent by weight of an organic peroxide having a thermal decomposition temperature above 95° C., with the heat-plastified mass and kneading the heated mixture for a period of time of from 3 to 15 minutes.

2. The method of making a thermoplastic composition containing a polymerized monovinyl aromatic hydrocarbon and a rubbery elastomer, which comprises blending from 75 to 95 parts by weight of a resinous polymer of a monovinyl aromatic hydrocarbon having the vinyl group as the sole non-aromatic unsaturation, from 2 to 20 parts of an unvulcanized rubber selected from the group consisting of natural rubber, rubbery copolymers of from 40 to 80 per cent by weight of butadiene and from 60 to 20 per cent of styrene, and copolymers of from 18 to 35 per cent by weight of acrylonitrile and from 82 to 65 per cent of butadiene and from 1 to 5 parts of a liquid plasticizer having a boiling point above 200° C., into a uniform mass by mechanically working a mixture of the ingredients at a heat-plastifying temperature between 140° C. and 230° C., thereafter incorporating from 0.001 to 0.25 per cent by weight of an organic peroxide having a thermal decomposition temperature above 95° C. with the heat-plastified mass and kneading the heated mixture for a period of time of from 3 to 15 minutes.

3. A process as described in claim 2, wherein the resinous polymer of a monovinyl aromatic compound is polystyrene.

4. A process as described in claim 2, wherein the resinous polymer of a monovinyl aromatic compound is polystyrene and the rubber is natural rubber.

5. The method of making a thermoplastic composition containing polystyrene and a rubbery copolymer of butadiene and stryrene, which comprises blending from 75 to 95 parts by weight of resinous polystyrene, from 2 to 20 parts of a rubbery copolymer of from 40 to 80 per cent by weight of butadiene and from 60 to 20 per cent of styrene, and from 1 to 5 parts of a liquid plasticizer having a boiling point above 200° C. into a uniform mass by mechanically working a mixture of the ingredients at a heat-plastifying temperature between 160° and 210° C., thereafter incorporating from 0.01 to 0.1 per cent by weight of di-(tertiary-butyl perphthalate) with the heat-plastified mass and kneading the heated mixture for a period of time of from 3 to 15 minutes.

6. The method of making a thermoplastic composition containing polystyrene and a rubbery copolymer of butadiene and acrylonitrile, which comprises blending from 75 to 95 parts by weight of resinous polystyrene, from 2 to 20 parts of a rubbery copolymer of from 65 to 82 per cent by weight of butadiene and from 35 to 18 per cent of acrylonitrile, and from 1 to 5 parts of a liquid plasticizer having a boiling point above 200° C. into a uniform mass by mechanically working a mixture of the ingredients at a heat-plastifying temperature between 160° and 210° C., thereafter incorporating from 0.01 to 0.1 per cent by weight of di-(tertiary-butyl perphthalate) with the heat-plastified mass and kneading the heated mixture for a period of time of from 3 to 15 minutes.

JAMES ROBERT DIECKMANN.
LAWRENCE W. MUSCOTT.
ARTHUR F. ROCHE.

No references cited.